(12) United States Patent
Ross et al.

(10) Patent No.: US 7,537,538 B2
(45) Date of Patent: May 26, 2009

(54) LIMITED SLIP DIFFERENTIAL

(75) Inventors: Craig S. Ross, Ypsilanti, MI (US);
Clinton E. Carey, Monroe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 284 days.

(21) Appl. No.: 11/416,901

(22) Filed: May 3, 2006

(65) Prior Publication Data
US 2007/0259751 A1 Nov. 8, 2007

(51) Int. Cl.
*F16H 37/08* (2006.01)
(52) U.S. Cl. .................................. 475/200; 475/206
(58) Field of Classification Search ............... 475/200, 475/203, 206, 214
See application file for complete search history.

(56) References Cited
U.S. PATENT DOCUMENTS

| | | | | |
|---|---|---|---|---|
| 3,027,780 A | * | 4/1962 | Storer, Jr. et al. | 475/18 |
| 4,280,375 A | * | 7/1981 | Goscenski, Jr. | 475/231 |
| 4,973,296 A | * | 11/1990 | Shibahata | 475/231 |
| 5,868,642 A | * | 2/1999 | Kobayashi | 475/203 |
| 5,904,634 A | * | 5/1999 | Teraoka | 475/231 |

* cited by examiner

*Primary Examiner*—Tisha D Lewis

(57) ABSTRACT

A vehicle powertrain includes an engine, transmission, differential mechanism, and a gearing mechanism to control speed relationships. The gearing mechanism includes a plurality of intermeshing gears, two of which are selectively interconnectible by a torque-transmitting mechanism. The gear mechanism is arranged to control the speed differential between two members of the differential mechanism and therefore to control the speed relationship between the output gears or side gears of the differential mechanism.

9 Claims, 1 Drawing Sheet

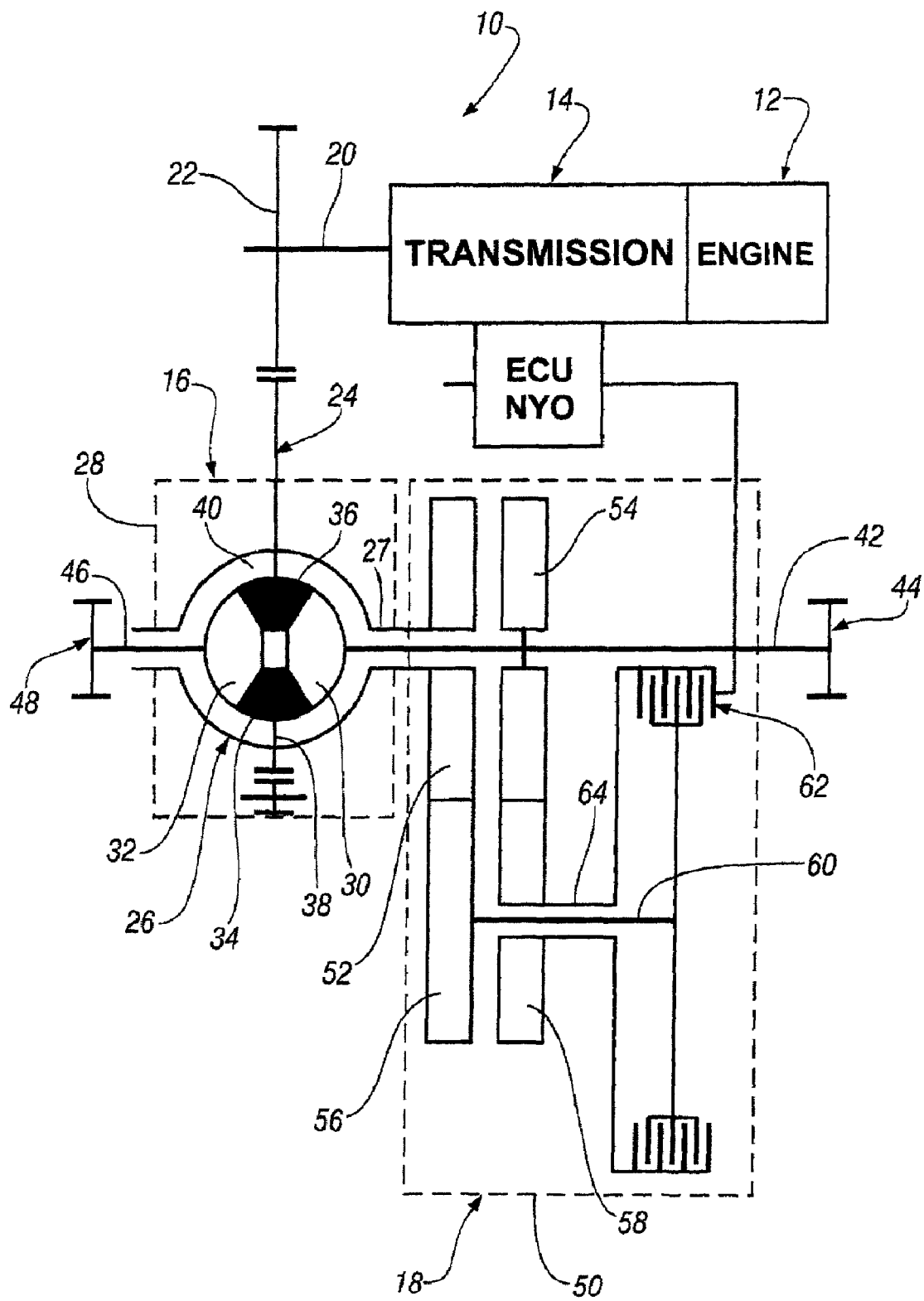

LIMITED SLIP DIFFERENTIAL

TECHNICAL FIELD

This invention relates to differentials found in vehicle drive trains and, more particularly, to differentials having a limited slip capability between the output axles of the differential.

BACKGROUND OF THE INVENTION

Automotive powertrains generally employ a transmission and a differential mechanism. The differential mechanism is included to permit distribution of power from the transmission to the drive wheels of a vehicle or to the fore and aft drive differentials of a vehicle. The differential mechanism commonly has an input gear member which rotates a housing or casing, a plurality of side gears, one of which is connected to drive a right axle and another of which is connected to drive a left axle.

The differential components for the most part rotate in unison with the rotation of the input gear. However, during some maneuvers, one axle may rotate more rapidly than the other. For example, if the vehicle is cornering, the outside wheel and axle and therefore the side gear of the differential rotate at a higher speed than the radially inner side gear of the differential. Also, when one axle is on a very slippery surface, such as snow or ice, that tire or wheel may rotate faster than the opposite tire or wheel that is on dry or good traction pavement. While the rotational difference during vehicle cornering is acceptable the rotation of one axle relative to the other resulting from slippage is not a desirable feature.

Many prior art differentials have included an internally operable clutch, which when sensing a speed differential between the two side gears is engaged to connect the two side gears together or to connect one side gear with the differential casing. In either event, the application of the clutch will cause unitary rotation of the differential device. That is, the casing and the side gears will rotate as a unit within the transmission differential.

SUMMARY OF THE INVENTION

It is object of the present invention to provide an improved limited slip differential.

In one aspect of the present invention, the differential has a carrier and two side gears with a gear mechanism operable between the one side gear and the carrier.

In another aspect of the present invention, the gear mechanism is external to the casing of the differential.

In yet another aspect of the present invention, the casing has a drive gear connected thereto, the side gear has a drive gear connected thereto, each of the drive gears have a transfer gear meshing therewith, and a selectively engageable torque-transmitting mechanism positioned to engage the two transfer gears to rotate in a controlled relationship.

In still another aspect of the present invention, when the transfer gears rotate in unison, a likewise rotational condition is present between the mechanism of the differential assembly such that both side gears rotate at the same speed.

In yet still another aspect of the present invention, the torque-transmitting mechanism is controlled by an electronic control system such that a controlled speed differential provided between the side gears of the differential.

DESCRIPTION OF THE DRAWINGS

FIG. 1 is a schematic representation of a vehicle powertrain incorporating the present invention.

DESCRIPTION OF AN EXEMPLARY EMBODIMENT

A transmission powertrain, generally designated 10, includes an engine 12, a multi-speed power transmission 14, a differential assembly 16, and a slip control mechanism, generally designated 18. The engine 12 is a conventional internal combustion mechanism. The transmission 14 is a conventional multi-speed planetary transmission or a conventional countershaft transmission, which includes an electronic control mechanism (ECM). The ECM also includes the hydraulic portion of the transmission control. This would generally include a hydraulic pump and a plurality of control valves.

The transmission 14 includes an output shaft 20, which has rotatably secured therewith a gear member 22. The gear member 22 rotatably drives a gear member 24, which in turn causes rotation of a differential housing or carrier 26. The differential carrier 26 is a member of the differential mechanism 16 and is disposed in a differential casing 28. The differential carrier 26 includes a sleeve shaft 27 extending axially from the differential carrier 26. The differential mechanism 16 also includes a pair of side gears 30 and 32 and a pair of transfer gears 34 and 36. The transfer gears 34 and 36 are rotatably supported on the carrier 26 such that they rotate about the axis of the carrier 26 and also are rotatable about their separate axes 38 and 40, respectively. The transfer gears 34 and 36 mesh with the side gears 30 and 32. The side gear 30 is drivingly connected with an axle 42, which is connected to drive one of the wheels 44 of a vehicle, not shown. The side gear 32 is drivingly connected with an axle 46, which in turn is drivingly connected with another of the vehicle wheels 48.

External to the differential casing 28 is a housing 50, which encloses the slip mechanism 18. The slip mechanism 18 includes a drive gear 52, which is rotatable with the sleeve shaft 27, a drive gear 54, which is rotatable with the axle 42, a transfer gear 56, which is meshingly engaged with the drive gear 52, and a transfer gear 58, which is meshingly engaged with the drive gear 54. The transfer gear 56 is connected by a shaft 60 with a portion of a torque-transmitting mechanism 62. The transfer gear 58 is connected to a sleeve shaft 64 with another portion of the torque-transmitting mechanism 62. The torque-transmitting mechanism 62 is selectively engageable by the ECM under predetermined operating conditions.

The ECM issues electronic signals from various sensors on the vehicle, such as wheel speed sensors, engine speed sensors, input speed sensors, transmission ratio sensor, engine temperature sensors, output speed sensor of the transmission, and a number of other conventional sensor mechanisms. The ECM issues hydraulic and electronic control signals in response to the various sensors of the vehicle. For example, the speed sensors signals of the wheels driven by the axles 42 and 46 are transmitted to the ECM, which then issues a signal to control the engagement of the torque-transmitting mechanism 62 if such operation is appropriate. For example, if either axle 42 or 46 is rotating faster than the other axle, and the ECM does not sense a significant steering effort, the torque-transmitting mechanism 62 is engaged, in a controlled manner, such that the speed difference between the gears 52 and 54 is controlled. It therefore controls the speed difference between the carrier 26 and the side gear 30. Since the differential mechanism is constructed such that the side gears 30 and 32 have a speed relationship, the speed of the side gear 32 is also controlled.

If the torque-transmitting mechanism 62 is fully engaged, the differential housing 26 and side gears 30 and 32 rotate in unison and therefore the axles 42 and 46 rotate at the same speed. The torque-transmitting mechanism 62 can be a conventional hydraulically operated clutch mechanism, which is capable of providing either a fully engaged condition or partially engaged condition. In the partially engaged condition, the input speed and the speed on one side of the torque-transmitting mechanism 62 is different than the speed on the other side of the torque-transmitting mechanism. For example, the shaft 60 can rotate at one speed and the shaft 64 can be rotated at a speed relative thereto determined by engagement capacity of the torque-transmitting mechanism 62. Thus, the speed differential between the gears 52 and 54 is controlled, which in turn controls the speed differential between the axles 42 and 46 in a well-known manner.

Since the differential assembly 16 and the slip control mechanism 18 are in separate housings, it is a simple matter to change the components therein without completely disassembling both of the mechanisms. While the torque-transmitting mechanism 62 is shown downstream, in the powerflow direction, from the gearing of the slip control mechanism, the torque-transmitting mechanism may be disposed on the opposite side of the gearing. The torque-transmitting mechanism, if desired, can be positioned to connect the gear member 52 with the carrier 26, in which instance the gears 56 and 58 would be continuously interconnected and the sleeve shaft 64 would be eliminated.

The invention claimed is:

1. A limited slip differential comprising:
a differential housing having a differential mechanism including a carrier member rotatably connected to a first sleeve shaft, and a pair of side gears rotatably mounted within said carrier member, with one of the side gears of the pair of side gears rotatably connected to a first shaft, wherein the first shaft is disposed coaxially within the first sleeve shaft; and
a control gear housing external to the differential housing, the control gear housing having a control gear mechanism having a first gear member rotatably secured to the first sleeve shaft, a second gear member rotatably connected to the first shaft, a first transfer gear meshing with said first gear member, a second transfer gear meshing with said second gear member, and a controlled slip torque-transmitting mechanism disposed to provide a drive relationship between said first and second transfer gear members.

2. A limited slip differential comprising:
a differential housing having a differential mechanism including a carrier member having a drive axis, and a pair of side gears rotatably mounted within said carrier member;
a control gear housing external to the differential housing, the control gear housing having a control gear mechanism including a first gear member rotatably secured with a sleeve shaft to said carrier member, a second gear member rotatably secured with a first shaft disposed inside of the sleeve shaft to one of said side gear members, a first transfer gear meshing with said first gear member, a second transfer gear meshing with said second gear member, and a controlled slip torque-transmitting means disposed to provide a selective drive relationship between said first and second transfer gear members for controlling a speed relationship between said carrier member and said one side gear; and
wherein said controlled slip torque transmitting means comprises a selectively engageable clutch mechanism having a fully engaged condition and a partially engaged conditions.

3. The limited slip differential defined in claim 2 further comprising:
said first and second gear members being rotatable about a common axis.

4. The limited slip differential defined in claim 2 further comprising:
said controlled slip torque transmitting means comprising a selectively engageable clutch mechanism.

5. The limited slip differential defined in claim 1 further comprising:
said controlled slip torque transmitting means comprising a selectively engageable clutch mechanism.

6. A limited slip differential comprising:
a differential housing including a differential mechanism having a drive axis, a carrier member, a first sleeve shaft fixedly mounted to the carrier member, and a pair of side gears rotatably mounted within the carrier member, wherein one of the side gears is rotatably coupled to a first solid shaft;
a control gear housing including a control gear mechanism having a first drive gear and a second drive gear, a first transfer gear intermeshed with the first drive gear and a second transfer gear intermeshed with the second drive gear, wherein the first transfer gear is rotatably supported by a second solid shaft and the second transfer gear is rotatably supported by a second sleeve shaft, and a controlled slip torque-transmitting device that selectively connects the second sleeve shaft and the second solid shaft; and
wherein the first sleeve shaft is rotatably coupled with the first drive gear and the first solid shaft is rotatably coupled with the second drive gear.

7. The limited slip differential of claim 6 wherein the controlled slip torque-transmitting device is capable of a fully engaged condition and a partially engaged condition.

8. The limited slip differential of claim 6 wherein the controlled slip torque-transmitting device is controlled by an electronic control mechanism.

9. The limited slip differential of claim 8 wherein the electronic control mechanism includes a hydraulic pump and a plurality of control valves.

* * * * *